(12) United States Patent
Schmidhauser et al.

(10) Patent No.: US 7,078,464 B2
(45) Date of Patent: Jul. 18, 2006

(54) ACID SALTS OF AMINE-FUNCTIONALIZED SMA IMIDE RESINS

(75) Inventors: John Schmidhauser, Paoli, PA (US); James Goodrich, Exton, PA (US); Bruce McEuen, Malvern, PA (US); William R. Dougherty, Lancaster, PA (US)

(73) Assignee: Sartomer Technology, Inc., Wilmington, DE (US)

( * ) Notice: Subject to any disclaimer, the term of this patent is extended or adjusted under 35 U.S.C. 154(b) by 186 days.

(21) Appl. No.: 10/462,917

(22) Filed: Jun. 16, 2003

(65) Prior Publication Data

US 2004/0002562 A1     Jan. 1, 2004

Related U.S. Application Data

(60) Provisional application No. 60/391,856, filed on Jun. 26, 2002.

(51) Int. Cl.
*C08F 220/10*  (2006.01)

(52) U.S. Cl. .............................. 525/330.3; 525/329.6; 525/333.3; 526/319; 526/346

(58) Field of Classification Search ............. 525/330.3, 525/329.6, 333.3; 526/319, 346
See application file for complete search history.

(56) References Cited

U.S. PATENT DOCUMENTS

| | | | | |
|---|---|---|---|---|
| 3,941,808 A | * | 3/1976 | Pratt | .......................... 525/379 |
| 4,618,655 A | | 10/1986 | Dehm | |
| 4,868,246 A | * | 9/1989 | MacLeay et al. | ........... 525/142 |

\* cited by examiner

*Primary Examiner*—Robert D. Harlan
(74) *Attorney, Agent, or Firm*—Crozen O'Connor, P.C.; Michael B. Fein, Esq.

(57) ABSTRACT

Compositions comprising acid salts of amine-functionalized styrene-maleic anhydride resins are disclosed. The salts can be dissolved in organic solvents, UV/EB polymerizable monomers and/or oligomers, and/or water and act as a polymeric surfactants to disperse pigments or fillers, emulsifying agents, or hard resin additives in a variety of formulations. The compositions react under UV/EB cure conditions, and provide enhanced properties such as cure speed, hardness and adhesion to polymer compositions.

16 Claims, 1 Drawing Sheet

ACID SALTS OF AMINE-FUNCTIONALIZED SMA IMIDE RESINS

CROSS-REFERENCE TO RELATED APPLICATIONS

Benefit of provisional patent application 60/391,856 filed Jun. 26, 2002 is claimed.

BACKGROUND ART

This invention relates to the field of copolymers of styrene and maleic anhydride (SMA) and to methods of preparation of SMA derivatives, methods of use, and compositions prepared from SMA.

Saturated carboxylic acid salts of imidized SMA copolymers were previously suggested for cationic polymerization systems. For example, Pratt, U.S. Pat. No. 3,941,808, disclosed SMA copolymers having pendant tertiary amine groups containing a salt-forming tertiary nitrogen atom neutralized to the extent of at least 75% with saturated mono-carboxylic acids having at least eight carbon atoms such as stearic, lauric, or behenic acid to form salts which lower the surface tension at oil-water interfaces. Dehm et al., U.S. Pat. No. 4,618,655, disclosed polymers containing styrene moieties and cyclic imide moieties reacted with saturated anhydrides. However, no one had previously suggested ethylenically unsaturated imidized SMA salts which are curable, promote cure speed, function as dispersants of pigments and fillers, as emulsifying agents, and are especially useful in radiation cure applications where they improve cure speed, hardness, and adhesion properties of polymer compositions.

DISCLOSURE OF THE INVENTION

In one aspect, the invention comprises a composition comprising an unsaturated carboxylic acid salt of an amine-functionalized styrene-maleic anhydride imide.

In another aspect, the invention comprises a method of preparing such salts comprising reacting an amine functionalized styrene-maleic anhydride imide copolymer with an unsaturated carboxylic acid to form a salt.

In yet another aspect, the invention comprises compositions which have been prepared from such salts and methods of using such salts as dispersing agents, emulsifying agents, crosslinking agents, hardeners, and adhesion promoters.

Compositions comprising a solution of the salt in water, in an organic solvent or in polymerizable organic monomers and/or oligomers, such as UV/EB-curable monomers and/or oligomers are another aspect of the invention.

The compositions of the invention may be in the form of a pigment dispersion, ink, varnish, wood coating or metal coating comprising the salt. In the form of a pigment dispersion, the composition further comprises pigment, water, defoamer and a non-ionic surfactant.

A method of using the salts as polymeric surfactants to disperse pigments or fillers, or as an emulsifying agent or as a hard resin additive are another aspect. More particularly, such a method may comprise dispersing, emulsifying, crosslinking, hardening or conferring adhesion properties to a polymer, oligomer or monomer composition by simply adding the salt of the invention to the said polymer, oligomer or monomer composition. Another aspect of the invention is a coating or a paint obtained by curing a composition of the invention, comprising the unsaturated imide salt.

The salts of the invention react under radiation such as UV or EB cure conditions, free radical polymerization conditions, and via Michael reactions and provide enhanced properties such as cure speed, hardness, and adhesion to finished products.

The salts can homopolymerize or copolymerize with other ethylenically unsaturated monomers and/or oligomers.

The salts can be used in coatings, inks, adhesives, paper applications such as paper coatings, paper sizing, paper making, electronic applications such as photoresists, carpet treatment, overprint varnishes, and other applications where other SMA resins have been used.

MODES OF CARRYING OUT THE INVENTION

Figure 1:
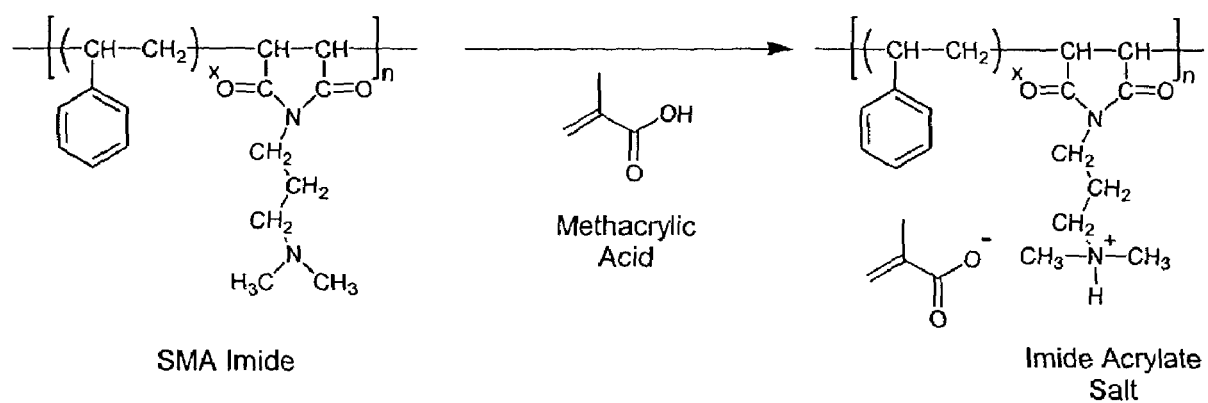
FIG. 1 is an example of a reaction to prepare the SMA imide salts of the invention.

The compositions of the invention comprising the salt of the unsaturated carboxylic acid and the amine-functionalized styrene-maleic anhydride imide copolymer can be prepared in most cases by simply mixing an amine functionalized styrene-maleic anhydride imide polymer with an unsaturated carboxylic acid in a solvent or carrier. The preferred solvent is water, but other suitable solvents can be used instead of, or in combination with, water. Such other suitable solvents can be, for example, organic solvents such as acetone or ethyl acetate, photo-polymerizable monomers, or monomer/oligomer mixtures. Suitable monomer/oligomer mixtures can include water soluble monomers such as polyether acrylates or polyacrylates. Some examples of suitable oligomers are epoxy acrylates, urethane acrylates, acrylated acrylics, and polyether acrylates which are water soluble.

A salt of the invention can be isolated as a solid from such a solution by removal of the solvent, and such solid can be added directly to a formulation, or the solid can be redissolved in a solvent which is different from that used during preparation of the salt. For example, the salt can be prepared in water, isolated, and redissolved in radiation curable monomers such as polyethylene glycol 400 acrylate.

Suitable unsaturated carboxylic acids for preparation of the salts of the invention are mono or poly unsaturated and include, for example, acrylic acid, methacrylic acid, maleic acid, fumaric acid, unsaturated hemi-esters of dicarboxylic anhydrides, butyl maleate, and cinnamic acid. The unsaturated carboxylic acids preferably have one to six carboxyl groups. Acrylic and methacrylic acids are preferred carboxylic acids. A mixture of a 1,2-unsaturated carboxylic acid and a saturated carboxylic acid and/or inorganic acid can be used in some embodiments, for example a mixture of acrylic acid and acetic acid can be used in some cases.

The amount of carboxylic acid used to prepare the salt can be determined by the amount of amine functionality on the SMA imide precursor. A molar ratio of carboxylic acid/SMA imide amine of about 0.5 to 1.5 is preferred, and a molar ratio of about 1.0 is most preferred.

The amine-functionalized styrene-maleic anhydride imide resin can be prepared reacting a styrene-maleic anhydride copolymer with a polyamine compound which contains a primary amine group and at least one tertiary amine group according to conventional methods.

Suitable diamines include, for example, N,N-dialkylaminoalkyl amines. A preferred diamine is N,N-dimethylaminopropyl amine. Among other amines that could be used are diethyl amino propyl amine (DEAPA), dimethyl amino butyl amine (DMABA), dimethyl amino ethyl amine (DMAEA), amino propyl morpholine, and diisopropyl amino propyl amine (DIAPA). SMA imides which can also be prepared from a mixture of a diamine and a monoamine. Suitable monoamines that could be used in combination with diamines include alkyl amines such as n-butyl amine, isopropyl amine, cycloaliphatic amines such as cyclohexyl amine, polyoxyalkylene amines such as methoxypolypropyleneoxy/polyethyleneoxy amines, and aromatic amines such as aniline.

Suitable styrene-maleic anhydride copolymers to be reacted with diamine or mixture of diamine and monoamine to form imides are those wherein the ratio of styrene to maleic anhydride in the copolymer is about 1/1 to 6/1, with a preferred ratio being about 2/1 by weight. The resultant SMA imide polymers may be of any suitable molecular weight, although a weight average molecular weight (Mw) of about 5,000 to 100,000 is preferred. The preferred range of repeating units is about 8 to 100.

The salts of the invention can be used in a wide variety of applications due to their combination of hydrophobic styrene and hydrophilic ammonium salt structural groups and having the ethylenic unsaturation. For example, the salts can be used as reactants in UV/EB cure formulations, as polymeric surfactants cure formulations, as dispersing agents for pigments or fillers, and as emulsifying agents to prepare acrylate emulsions, for example overprint varnishes. The salts can also be used in water based pigment dispersions used in making water-based UV/EB curable inks such as ink jet inks.

Such water based pigment dispersions can be used in the pH 4–7 range and therefore should have improved stability versus the conventional acrylated monomers and oligomers used in water based UV ink jet inks. Pigment dispersions prepared using conventional salts of polyacrylate resins typically have a pH of 8–9.5, which contributes to the instability of certain water based UV ink jet inks derived from them.

The salts can be cured by any type of reaction in which other ethylenically unsaturated monomers react, for example by Michael addition, radiation, and free radical polymerization.

Free radical polymerization of the salts can be in the presence of conventional peroxy initiators. The salts can be homopolymerized or copolymerized with other unsaturated monomers or with oligomers, for example styrene and styrene derivatives, acrylates, methacrylates, and acrylamide monomers, epoxy- or urethane-acrylate or methacrylate oligomers, and unsaturated polyester resins.

Among the radiation curing methods, the salts will participate in the UV or EB cure reactions.

The use of the salts in such curing reactions contributes to desirable curing kinetics and to enhanced properties in finished products.

The preferred salts contain, on average, 8–100 acid salt functional groups per resin molecule and therefore should increase cure speed when added to UV/EB cure formulations. The salts have a high Tg compared to typical monomers and resins that are used in water-based UV/EB formulations which involve low-Tg polyether chemistry. Thus, in combination with their multifunctional characteristics which increase cross-link density, the salts contribute to higher hardness and higher thermal properties in radiation cured compositions.

The following examples in which all parts and percentages are by weight unless otherwise indicated illustrate a few embodiments of the invention.

EXAMPLES

Example 1

Preparation of a 31% Solids Aqueous Solution of an Imidized SMA-Methacrylic Acid Salt 125 Parts of a 2/1 styrene/maleic anhydride copolymer imidized with N,N-dimethylaminopropyl amine and 344 parts water are placed in a reactor with air sparge, agitator and temperature control. Agitation is started to create a slurry of the SMA imide in water. 31 Parts methacrylic acid are slowly added and then the mixture is heated and stirred at 50 deg. C. for 1 hour or until all of the imide dissolves. The resulting clear yellow 31% solids solution was cooled to room temperature. The product solution had a pH of 5.5 and a viscosity of 1000 centipoise. This reaction is illustrated in FIG. 1.

Example 2

Coating Prepared from the Methacrylic Acid Salt of the Imidized SMA of Example 1

A solution was prepared containing 100 parts of the salt of Ex. 1, 31 parts polyethylene glycol diacrylate as solvent, and 5 parts of aqueous oligomeric alpha hydroxyl ketone photoinitiator solution, 32% solids in water. The solution was drawn down onto a metal substrate and allowed to dry for 48 hours.

The resulting coating was cured under a Fusion 400 W/in H bulb, using a cure speed of 50 ft/min, with 134 mJ/cm2 of energy, as measured with an International Light IL390B.

The resulting coating was hard, and non-tacky with excellent adhesion properties.

Example 3

Pigment Dispersions Prepared from the Methacrylic Acid Salt of the SMA Imide

SMA Imide Methacrylate Salt, defoamer, surfactant and water are mixed in blender for 1 minute at low shear. In the same blender pigment is added in 3 separate charges. The mixing is on medium speed to integrate pigment into liquids and is then blended at high speed for 15 minutes, following which 25% pigment concentrate/75% 0.8 mm YTZ media are charged into an Eiger mill. The mill is run for 20 minutes at 5000 rpm followed by mixing in re-circulation mode, with a residence time of approximately 10 minutes. The formulations for blue, yellow, red and black dispersions are as follows:

| Pigment | Blue 15:3 Phthalocyanine Blue | Yellow 74 Arylide Yellow | Red 122 Quinacridone Magenta | Black 7 Carbon Black |
|---|---|---|---|---|
| % Pigment | 25 | 32 | 35 | 40 |
| Defoamer | Dee Fo PI-35 | Dee Fo PI-35 | Dee Fo PI-35 | Dee Fo PI-35 |
| % Defoamer | 0.42 | 0.5 | 0.5 | 0.54 |

-continued

| Pigment | Blue 15:3 Phthalocyanine Blue | Yellow 74 Arylide Yellow | Red 122 Quinacridone Magenta | Black 7 Carbon Black |
|---|---|---|---|---|
| % Ethoxylated cardanol Surfactant | 1.77 | 2.14 | 0 | 2.31 |
| % SMA Imide Methacrylate Salt | 14.38 | 8 | 8 | 8.9 |
| % Water | 58.4 | 57.4 | 56.5 | 48.2 |
| Pigment:Binder Ratio | 1.74 | 4 | 4.38 | 4.5 |

Example 4

Pigment Dispersion Stability Testing

Each sample was stored at both 25° C. and 49° C., and the viscosity was measured periodically. The dispersions were stable until the times noted below:

When stored for 130 days at 25° C., no change in viscosity and no pigment settling were observed.

When heated at 49° C. in an oven, the black and blue compounds were stable for 45 days, the red compounds were stable for 37 days, and the yellow compounds were stable for 22 days.

Example 5

Ink Prepared from Pigment Dispersion Made with Methacrylic Acid Salt of the SMA Imide The series of ink formulations reported in the following table was prepared by blending monomer, oligomer, additional dispersant, and water at low shear, and adding dispersions from Example 4, under low shear and then slowly stirring for one hour:

| Ink Formulation Components | Blue | Yellow | Red | Black |
|---|---|---|---|---|
| % Dispersion (from example 4) | 20 | 15.6 | 14.3 | 12.5 |
| % SMA Imide Methacrylate Salt | 0 | 2.75 | 1.63 | 0 |
| % Polyethylene glycol diacrylate | 14 | 14 | 14 | 14 |
| % 15 mole Ethoxylated trimethylolpropane triacrylate | 6 | 6 | 6 | 6 |
| % 1-[4-(2-Hydroxyethoxy)-phenyl]-2-hydroxy-2-methyl-1-propane-1-one | 2.4 | 2.4 | 2.4 | 3 |
| % Added Water | 57.6 | 59.2 | 61.7 | 64.5 |
| % Final Water | 69.3 | 67.9 | 69.7 | 70.6 |
| Viscosity, cps | 7 | 19 | 10 | 5 |
| PH | 5.4 | 6.3 | 5.8 | 5.9 |

Example 6

Ink Stability Testing

Each sample was stored at 25° C., and the viscosity was measured periodically. The inks were stable until the times, along with the mode of failure, as noted below:

| Blue | Yellow | Red | Black |
|---|---|---|---|
| 92 days, separation | 47 days, thixotropy, separation | 85 days, separation | >110 days |

While the invention has been described and illustrated in detail herein, various modifications, alternatives, improvements, and alterations should be readily apparent to those skilled in this art without departing from the spirit and scope of the invention.

What is claimed is:

1. A composition comprising a salt of an unsaturated carboxylic acid selected from the group consisting of acrylic acid, methacrylic acid, maleic acid, fumaric acid, and an unsaturated hemi-ester of a dicarboxylic anhydride, and cinnamic acid; and an amine-functionalized styrene-maleic anhydride imide copolymer.

2. The composition of claim 1 wherein the amine-functionalized styrene-maleic anydride imide copolymer is an imide copolymer prepared from styrene-maleic anhydride copolymer (SMA) and a polyamine compound having a primary amine and at least one tertiary amine.

3. The composition of claim 1 wherein the amine-functionalized styrene-maleic anydride imide copolymer is an imide copolymer prepared from styrene-maleic anhydride copolymer (SMA) and a an N,N-dialkylaminoalkyl amine.

4. The composition of claim 1 wherein the amine-functionalized styrene-maleic anydride imide copolymer is an imide copolymer prepared from styrene-maleic anhydride copolymer (SMA) and N,N-dimethylaminopropyl amine.

5. A composition comprising a solution of the salt of claim 1 in water, an organic solvent, UV/EB-curable organic monomer, and/or UV/EB curable organic oligomer.

6. The composition of claim 1 further including a photoinitiator and being curable under UV or EB conditions.

7. The composition of claim 1 in the form of a pigment dispersion, ink, varnish, wood coating, or metal coating.

8. The composition of claim 1 in the form of a pigment dispersion which comprises pigment, water, defoamer, and non-ionic surfactant.

9. A method comprising dispersing, emulsifying, crosslinking, hardening, or conferring adhesion properties to a polymer, oligomer, or monomer by adding a salt of an unsaturated carboxylic acid selected from the group consisting of acrylic acid, methacrylic acid, maleic acid, fumaric acid, and an unsaturated hemi-ester of a dicarboxylic anhydride, and cinnamic acid, and an amine-functionalized styrene-maleic anhydride imide copolymer to the polymer, oligomer, or monomer.

10. A composition prepared by curing the composition of claim 1.

11. The composition of claim 10 in the form of a coating or paint.

12. A method of curing the composition of claim 1 comprising Michael addition, free radical polymerization, or radiation curing.

13. A copolymer of the salts of claim 1 prepared by reacting the salt with a different ethylenically unsaturated monomer or oligomer.

14. A homopolymer of the sail of claim 1.

15. A method of preparing a composition according to claim 1 comprising reacting an amine-functionalized styrene-maleic anhydride imide with an unsaturated carboxylic acid to form a salt.

16. A salt prepared according to the method of claim 15.

* * * * *